3,294,776
METHOD OF DEALLERGENIZING CASTOR BEANS BY TREATING WITH ONE MOLAR AMMONIUM HYDROXIDE AND WITH AT LEAST ONE PART OF WATER PER PART OF CASTOR BEAN MATERIAL

Laurence L. Layton and Frank C. Greene, Berkeley, Calif., assignors to the United States of America as represented by the Secretary of Agriculture
No Drawing. Filed Nov. 22, 1963, Ser. No. 325,798
4 Claims. (Cl. 260—123.5)

A non-exclusive, irrevocable, royalty-free license in the invention herein described, throughout the world for all purposes of the United States Government, with the power to grant sublicenses for such purposes, is hereby granted to the Government of the United States of America.

This invention relates to and has as its primary object the provision of novel methods for the deallergenization of castor bean products. Further objects and advantages of the invention will be evident from the following description wherein parts and percentages are by weight unless otherwise specified.

The production of castor oil involves such conventional procedures as flaking of the castor bean meats, cooking, and removal of the oil by pressing or extraction with a solvent such as hexane. The residual material, known as castor pomace, despite its substantial content of proteins has a low commercial value because it contains certain undesirable constituents including toxic materials and allergens. In general, the toxic materials offer less of a problem as they are readily destroyed by heating the castor pomace. However, the allergens are a particular problem because they are heat-stable. Because of the large amount of allergens in the pomace and their marked effect on humans, the pomace, even after detoxification, must be handled very carefully and contact therewith must be avoided, particularly by persons who have been sensitized to the castor allergens. Such sensitization may be acquired through prior contact with commercial castor bean products, with pollen from castor bean plants grown as ornamentals, or even contact with pollen or seeds from related plants such as poinsettia, leafy spurge, etc. Various methods of deallergenizing castor pomace have been studied and generally involve heating it in the presence of strong alkali, such as calcium or sodium hydroxide.

In accordance with the invention, the deallergenization is accomplished by mixing the pomace with aqueous ammonium hydroxide and heating the mixture under pressure. The ammonium hydroxide is applied as such when the treatment is initiated but it is evident that ammonia will be formed to some extent during the heating and thus the treatment can be considered as a heating of the pomace in the presence of water, ammonium hydroxide, and ammonia. The temperature of the treatment may be varied from about 100° C. to 150° C. and, as in other chemical reactions, the destruction of the allergenic principles occurs more rapidly at the higher temperatures in the said range. To prevent loss of water and ammonia, and to maintain the water largely in the liquid phase, the treatment is conducted in a pressure-tight vessel such as an autoclave. The pressure generated in the vessel will depend on the particular temperature selected and may aptly be referred to as an autogenous presssure, that is, one created by the conditions applied. A critical factor in the treatment is that there be present during the entire course of the process an adequate amount of water, namely, at least one part of water per part of pomace. Our researches have demonstrated that ammonia treatments applied to pomace containing relatively low proportions of water—i.e. up to about 50%—yield ineffective results in that the allergens are not inactivated or only inactivated to a minor extent. Where, however, a high proportion of liquid water is present as aforesaid, the deallergenization is essentially complete. The reason for the critical effect of liquid water on the process is not fully understood. However, it is theorized that by using the large proportion of water, the continuous presence of high concentrations of ammonium hydroxide is assured; where the proportion of water is low, ammonium hydroxide is largely dissociated into $NH_3$ and water as vapor. Regardless of any theoretical considerations, however, our investigations have shown that the use of a large proportion of water is effective, whereas a small proportion is not. In this connection, reference is made to the work of Gardner et al. (Jour. Amer. Oil Chemists' Soc., vol. 37, No. 3, pages 142–148, March 1960) who heated castor meal containing up to 17% $H_2O$ with large excesses of $NH_3$ gas (up to 100 p.s.i.g.) and attained no reduction in allergen content over the control—a product which had been prepared by alkali-cooking of the raw castor flakes prior to oil extraction.

The amount of ammonium hydroxide used in the treatment may be varied with the proviso that such amount is added so that the water in the system has a molar concentration of $NH_4OH$ of at least one. Faster deallergenization is attained with higher concentrations and in general one can economically use a molar concentration as high as four. Still higher concentrations of $NH_4OH$ can be used effectively but introduce added expense without added benefit. The time required for the treatment will vary on such factors as the $NH_4OH$ concentration, and particularly on the temperature selected. In any particular case, pilot trials can be carried out on small lots of material to ascertain the time of treatment required to attain essentially complete destruction of the allergenic principles. In typical runs, using a temperature of 120° C. and 2 volumes of $NH_4OH$ with a concentration of one molar, complete deallergenization was obtained in 60 minutes.

Following the treatment as described above, the product may be treated to recover the ammonia therefrom. This may be accomplished by heating the product in a conventional evaporation apparatus equipped with a condenser or absorption unit for collecting the ammonia from the evolved vapors. The product may then be dried in the same apparatus or in a conventional dehydrator with a current of hot air or it may be dried under vacuum. Instead of removing ammonia, the entire product may be neutralized with an acid such as sulphuric or phosphoric and the neutralized product dried. The presence of the ammonium salt will enhance its value as a fertilizer and possibly as a feed for ruminants. The products of the process of the invention are generally useful as fertilizers and as animal feeds because of their high protein content.

A particular advantage of the preferred process of the invention is that the deallergenization is accomplished in a single step applied to the meal. Thus it is not necessary, as advocated in some prior deallergenization treatments, to additionally give the castor bean material (while still containing its oil content) a cook with alkali. Instead, the ammonia treatment of the invention is the only alkali treatment and is applied after the oil is extracted from the castor beans. Thus in a complete system of applying the invention, the castor bean meats are flaked by passing through rollers, the flakes are cooked in conventional manner—i.e., at their autogenous pH—and the oil removed from the cooked flakes. The residual material, the meal or pomace, is then treated with ammonium hydroxide and water as previously described.

Although the deallergenization procedure of the invention is usually applied to castor pomace, it can be applied to other castor bean materials, for example castor bean flour, non-defatted castor materials, etc.

The invention is further demonstrated by the following illustrative examples. For comparative purposes, certain runs using conditions outside the ambit of the invention are included.

The products were tested for allergenicity by the following method:

Passive cutaneous anaphylaxis (PCA): Blood serum is prepared from rabbits which had been sensitized by injections of castor bean allergens. This serum, diluted 1:10 with isotonic saline solution, is then injected intradermally into the abdominal skin of albino guinea pigs, using about 0.05 ml. of diluted serum for each injection. The injection sites on the abdomen are spaced on about 1" centers to allow for a series of separate tests. Then, 1 ml. of isotonic saline solution containing 0.5% Evans blue dye and 10-20 mg. of the material to be tested as a clear solution is injected into the cephalic vein of each guinea pig. In the event that the material contains the allergens, a positive reaction for passive cutaneous anaphylaxis is indicated in 2-5 minutes by bluing of the skin around the site of the serum injection and often, formation of a wheel. The bluing phenomenon is due to dye leakage into the extravascular spaces because of increased permeability of the minute blood vessels in the inflamed area. In the event, however, that the material tested does not contain the allergens, neither wheal formation nor bluing results. The test is so sensitive that a positive indication is obtained with as little as one microgram of isolated castor bean allergen.

Although the above-described method is used routinely for testing the products for allergenicity, castor pomace treated in accordance with the invention has been tested for allergenicity upon castor-allergic human beings and upon passively sensitized monkeys and shown to be non-allergenic.

*Example I*

Five grams of castor pomace and 10 ml. of 1.0 molar aqueous ammonium hydroxide solution were heated in an autoclave at 120° C. (15 p.s.i.g.) for 1 hour. The product was then removed from the autoclave and subjected to vacuum to remove ammonia and water. Two other runs were carried out as described above but using different concentrations of ammonium hydroxide, namely, 0.75 molar and 0.5 molar.

The three products were tested by the procedure described above. The results are tabulated below:

| Run | Concentration of $NH_4OH$, molar | $H_2O$ in reaction mixture,* percent | P.C.A. test |
|---|---|---|---|
| 1 | 1.0 | 65.4 | Negative. |
| 2 | 0.75 | 65.7 | Positive. |
| 3 | 0.50 | 66.0 | Do. |

* Exclusive of moisture content of pomace.

*Example II*

The starting material in this example was castor flour, a product made as follows: Castor beans are crushed and the fat extracted without any heat treatment. The defatted material is then treated to remove the seed coats and the residue, very high in protein content and allergens, is ground to the consistency of flour.

Five-gram samples of the castor flour were mixed with 10 ml. of aqueous ammonium hydroxide solution (1 or 2 molar) and the mixtures were heated in an autoclave at 118° C. for one hour. The results are tabluated below:

| Run | Concentration of $NH_4OH$, molar | $H_2O$ in reaction mixture,* percent | P.C.A. test |
|---|---|---|---|
| A | 1 | 65.4 | Negative. |
| B | 2 | 64.2 | Do. |

* Exclusive of moisture content of flour.

Having thus described the invention, what is claimed is:

1. A process for deallergenizing castor bean material which comprises mixing the castor bean material with at least one part water per part of said material and with ammonium hydroxide in an amount sufficient to provide at least a 1-molar concentration of $NH_4OH$ in the water in the mixture and heating the said mixture under autogenous pressure at a temperature about from 100 to 150° C.

2. The process of claim 1 wherein the castor bean material is castor pomace.

3. A process for deallergenizing castor pomace which comprises mixing the pomace with at least one part of water per part of pomace and with ammonium hydroxide in an amount sufficient to provide at least a 1-molar concentration of $NH_4OH$ in the water in the mixture and heating the said mixture under autogenous pressure at a temperature of about 120° C. for a period of about 1 hour.

4. In the process wherein castor bean meats are flaked, cooked at their autogenous pH, and the oil extracted therefrom, leaving a residue of castor pomace, the improvement which comprises deallergenizing the castor pomace by mixing it with at least one part water per part of pomace and with ammonium hydroxide in an amount sufficient to provide at least a 1-molar concentration of $NH_4OH$ in the water in the mixture, and heating the said mixture under autogenous pressure at a temperature about from 100 to 150° C.

References Cited by the Examiner

Journal of Scientific Food Agriculture, 14 (11), 1963, pages 773-80.

Journal of American Oil Chemists Society (Gardner et al.), vol 37, pages 142-148 (1960).

WILLIAM H. SHORT, *Primary Examiner.*

H. E. SCHAIN, *Examiner.*